United States Patent Office 3,111,376
Patented Nov. 19, 1963

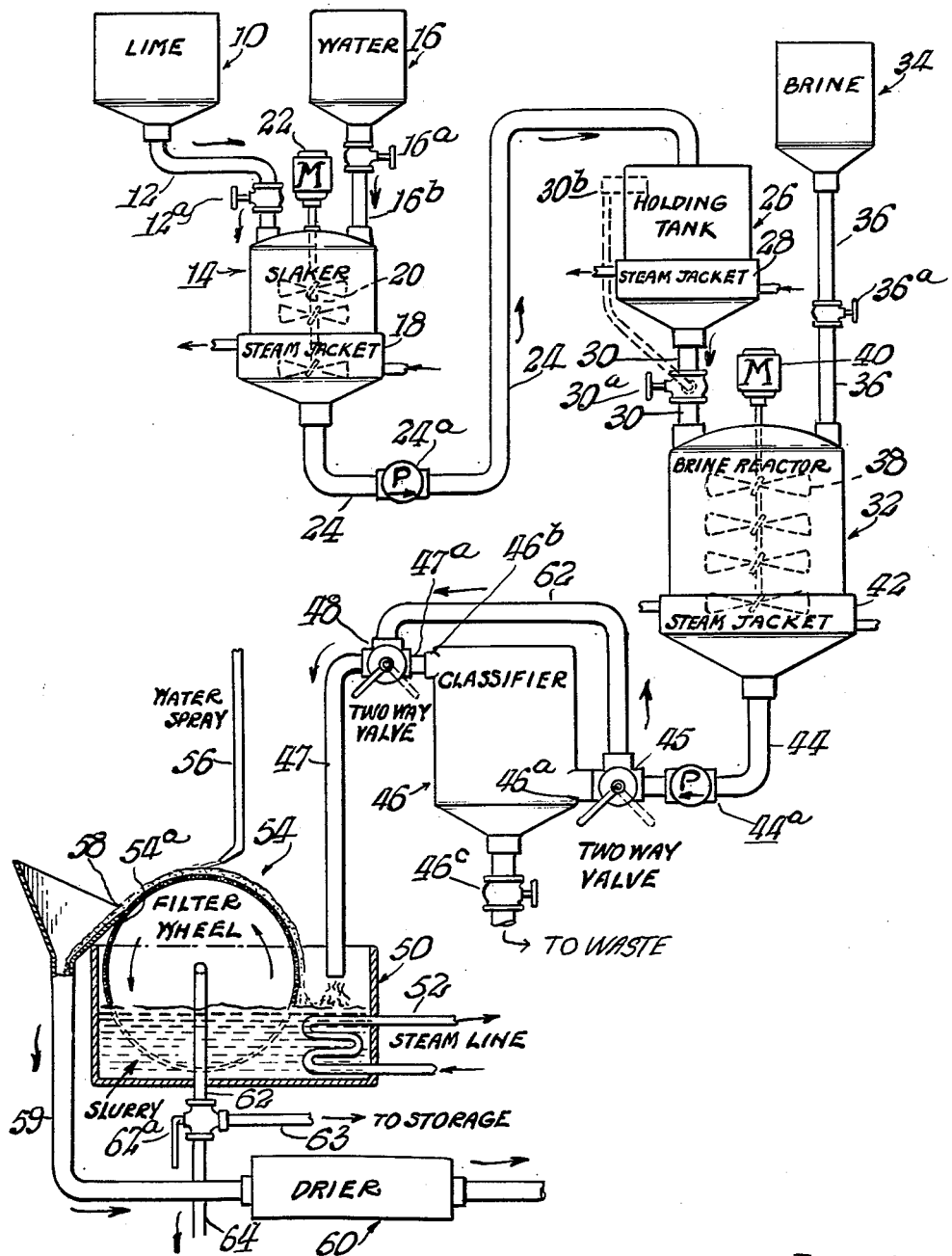

3,111,376
PRODUCTION OF MAGNESIUM HYDROXIDE
Richard A. Patton, Woodstock, and Charles Baugh, Crystal Lake, Ill., assignors, by mesne assignments, to Morton Salt Company, Chicago, Ill., a corporation of Delaware (new corporation)
Filed Feb. 27, 1961, Ser. No. 91,800
15 Claims. (Cl. 23—201)

This invention relates to improvements in the production of magnesium hydroxide and more particularly to improvements in the process for producing magnesium hydroxide from dolomitic quicklime.

It is well known that magnesium hydroxide may be readily produced by calcining and slaking natural magnesium-containing minerals, such as magnesite (magnesium carbonate).

Dolomite or dolomitic limestone, also used in the production of magnesium hydroxide, is composed essentially of magnesium and calcium carbonates. In order to produce a relatively pure magnesium hydroxide, it is necessary to treat the dolomite to remove the calcium component, inasmuch as this represents a deleterious material in many of the commercial uses to which the product is applied. Conventional procedures involve the calcination of dolomite to produce a dolomitic quicklime, slaking of the lime to produce the calcium and magnesium hydroxide, treating the slaked lime with a magnesium chloride brine to solubilize the calcium hydroxide component and recovering the magnesium hydroxide by washing, settling, and filtration.

One difficulty with the prior art procedures is the tendency of the magnesium hydroxide in reacting to form a gelatinous precipitate which is difficult to wash and filter. The selection of a lime of rather large particle size results in some improvement, but the large lime particles require extended time periods in the brine treatment step to allow for adequate diffusion, i.e., of 40 to 90 minutes. Moreover, the prolonged washing required to remove the dissolved calcium salt (i.e., $CaCl_2$) formed in the brining step by reaction of calcium hydroxide with magnesium chloride, resulted in gelatinization of the precipitate. This gelatinization results in a product which requires extended filtering time to remove fluids, so that the filtering rate is normally from about 0.5 up to a maximum of about 1.2 pounds of solids per hour per square foot of filter surface. The overall process for producing a magnesium hydroxide extended from as long as 24 hours to several weeks.

From the foregoing it may be understood that many of the problems associated with the production of magnesium hydroxide from dolomitic quicklime reside in the steps involved in the slaking of the crude calcined dolomitic quicklime, treatment with brine, and subsequent washing to produce a purified magnesium hydroxide.

Accordingly, it is an object of this invention to provide an improved process for preparing a purified high grade magnesium hydroxide.

Another object is the provision of an improved process for producing a magnesium hydroxide of high quality from a dolomitic quicklime by a continuous process.

A still further object is the provision of an improved process for producing magnesium hydroxide from dolomitic quicklime that has a reduced equipment cost and has improved handling characteristics.

These and other objects of the present invention will be seen from the following specification and appended claims.

In one broad form the present invention is a continuous process for producing magnesium hydroxide which comprises slaking a dolomitic quicklime with water at a temperature of from between about 37° C. and the boiling point of the slaking mixture for a period of at least 90 minutes to form a slurry of slaked lime, admixing and contacting the said slurry of slaked lime with a magnesium chloride brine under high shear conditions at a temperature of from about 37° C. to the boiling point of the slurry for a period of from 2 to 12 minutes and thereafter concomitantly filtering and washing said slurry to recover the magnesium hydroxide product, said contacting and admixing with brine being carried out within a period of from about 30 to about 180 minutes, immediately prior to the filtration step.

The dolomitic quicklime used as a starting material in this process is conventionally derived from a dolomitic limestone by calcination. Preferably the dolomitic quicklime is of a fine particle size, at least finer than 70 mesh (U.S. standard screen scale) and in the most preferred aspects less than 100 mesh. The quicklime should not contain more than about 2.0 percent of $CO_2$, $SO_4^=$, silica, $Fe_2O_3$ and $Al_2O_3$ expressed as calcium oxide equivalent. The total CaO and MgO content should not be less than 97 percent.

The slaking of the dolomitic quicklime with water is carried out at temperatures of from 37° C. to the boiling point of the slaking admixture, preferably from 50° C. to about 100° C. and in the most preferred instance from 80 to 95° C. As indicated, the time of slaking should be at least 90 minutes and preferably at least 120 minutes, although times greater than 180 minutes result in no beneficial effect.

The brine treatment of the slaked dolomitic lime is carried out with a magnesium chloride brine. It is herein contemplated that the term magnesium chloride brine shall include a chemical brine containing other salts in addition to magnesium chloride, such as sodium chloride and/or calcium chloride. The magnesium chloride brine treatment may be carried out at temperatures of from 37 to the boiling point, preferably at temperatures of from 50 to 100° C. and in the most preferred aspects between about 70 and 95° C.

The reaction between the magnesium chloride brine and the slaked dolomitic lime or the dolomitic lime is preferably carried out under high shear conditions. For example, using a rotary agitator, the tip speed may vary in the preferred instance from 1000 to 4000 feet per minute. The time of treatment is broadly from about 2 to about 12 minutes, and preferably from about 4 to about 6 minutes.

The amount of magnesium chloride brine utilized should be sufficient to fulfil the stoichiometric requirements to convert the calcium hydroxide to magnesium hydroxide in accordance with the reaction set forth in the following equation:

$$Ca(OH)_2 + MgCl_2 \rightarrow Mg(OH)_2 + CaCl_2$$

In the most preferred aspects, brine utilized should, in aggregate, contain up to about a 10 percent stoichiometric excess of magnesium chloride, and at least a 3% excess.

After the brine treatment of the slaked dolomitic lime has been carried out, it has been found desirable in some instances to carry out an additional purification of the resulting magnesium hydroxide slurry. This step may be advantageously accomplished by passing the effluent magnesium hydroxide slurry in brine solution from the brine reaction chamber to a hydraulic classifier to remove heavy impurities, such as calcium carbonate, calcium sulfate, calcium silicate and aluminum silicate, while recovering as an overhead fraction the magnesium hydroxide slurry. The hydraulic classification is usually carried out continuously on the effluent slurry from the brine reactor, which slurry preferably has a solids content of from 6 to 12 percent. It should be understood that this supplementary purification step is not a requirement for the successful operation of the invention and the slurry may, if desired, be passed directly to a holding tank or vessel for filtration and washing, although a higher purity product will result from the use of such a supplementary purification.

The purified magnesium hydroxide slurry resulting from the above described hydraulic classification, or the slurry directly from the brine reactor, is filtered to remove the brine and recover the magnesium hydroxide. The product is preferably washed at the same time. The filtering-washing step may be carried out concomitantly by the use of conventional filtering apparatus, such as a filter wheel. In this procedure the slurry from the filter wheel tub is accumulated on the filter wheel screen and the excess brine removed. The filter cake is then washed by spraying or the like while on the filter wheel screen. Conventionally from about 0.6 to about 1.2 gallons of water per pound of magnesium hydroxide are used in this washing step. After the debrining and washing step is complete, the resulting filter cake as recovered from the filter wheel has a solids content of from about 46 to about 54 percent. The product may then be dried in an oven and pulverized for packaging or otherwise handled for further treatment, such as calcining, to produce magnesium oxide.

It should be understood that the recovery of the magnesium hydroxide slurry, by means of concomitant filtration and washing, should be initiated within a period of up to about 180 minutes from the time of first contact of the slaked dolomitic quicklime with the magnesium chloride brine. Preferably the aforesaid overall time period should be from about 45 to 75 minutes. The total time period referred to should also be understood to include residence time in a filter wheel tub or similar holding tank.

For a more complete understanding of the process of this invention reference should be had to the drawing which comprises a flow sheet or schematic diagram illustrating in one form the apparatus utilized in carrying out the process of the present invention. In that drawing, dolomitic quicklime is fed from storage bin 10 is fed continuously via line 12 to slaker 14. To the dolomitic quicklime in slaker 14 water from reservoir 16 is added through line 16b to form a reaction mixture or slurry of dolomitic quicklime in water in the slaker 14. The water from reservoir 16 is preheated and the slaking slurry is maintained at a predetermined temperature during the slaking operation by means of a steam jacket 18. The slaker 14 is equipped with an agitator 20 driven by a motor or power source 22. The reacted slurry of slaked quicklime is passed continuously from slaker 14 via conduit 24 and intermediate pump 24a to holding tank 26.

The feed of lime and water to slaker 14 through lines 12 and 16b is controlled by means of valves 12a and 16a, respectively. These valves may be operated so as to coordinate with the pump 24a to regulate and balance the rate of feed and withdrawal of materials to slaker 14. Automatic means (not shown) may be used to couple and control the valves, if desired.

The slurry of slaked dolomitic quicklime is accumulated in the holding tank 26 which is preferably equipped with a steam jacket 28 to control and maintain the temperature of the contents. The slurry accumulated in tank 26 passes via conduit 30 to brine reactor 32. Valve 30a in line 30 is used to regulate the flow of slurry from tank 26 to reactor 32. The valve 30a may be coordinated with a level control 30b to regulate feed to the reactor. If desired, the valve 30a may be automatically coordinated by conventional apparatus (not shown) with valves 12a and 16a regulating the feed of starting material. A preheated magnesium chloride brine from tank 34 is introduced into the brine reactor 32 through line 36 and valve 36a to the reactor 32. The rate at which the magnesium chloride brine is introduced to the slurry of slaked dolomitic quicklime in reactor 32 is controlled by means of valve 36a, which in turn is coordinated with valve 30a to achieve correct proportioning. The brine reactor 32 is equipped with an agitator 38 driven by a motor or power source 40. The temperature of the brine reactor slurry is maintained at a predetermined level by means of steam jacket 42 on reactor 32.

While the type of brine reactor used may be varied, the equipment should be adapted for mixing under high shear conditions. One particularly useful apparatus is that described in the Patton and Baugh application Serial No. 654,925, filed April 24, 1957, now abandoned.

After reaction with the brine, the slurry is passed from reactor 32 via conduit 44 through pump 44a and two-way valve 45 to cone bottom hydraulic classifier 46. The slurry feed enters the classifier at 46a and is removed at 46b. The heavy impurities are removed from the cone bottom through valve 46c which is automatically opened at scheduled intervals. One convenient form of metering valve for this purpose is a Jamesbury valve.

The purified slurry is removed from the hydraulic classifier through line 47a, two-way valve 48, and passed via line 47 to filter wheel tub 50. The filter wheel tub (shown in section) is provided with heating elements 52 to maintain the purified magnesium hydroxide slurry in brine at a predetermined temperature. The magnesium hydroxide solids in the slurry in tub 50 are collected on the screen 54a of filter wheel 54.

The solids on the filter wheel screen 54a are washed with a water spray 56 and the washed filter cake is removed from filter wheel screen 54a by collector 58, passed through conduit 59 and through drier 60. The dried magnesium hydroxide recovered from drier 60 may be packaged as such, or may be further treated, such as by calcining, to produce magnesium oxide.

The brine component of the slurry entering the filter wheel tub 50 is chiefly a calcium chloride brine. This calcium chloride brine is recovered from the filter wheel operation and passed via line 62 and two-way valve 62a to storage (line 63) or to further treatment (line 64) such as by concentration, purification, or the like.

While the hydraulic classification procedure may be carried out as described in the foregoing to result in a highly purified product, it should be understood that the process may also be carried out without hydraulic classification by feeding the slurry from the brine reactor through by-pass line 62 directly to the filter wheel tub. In this modification the valves 45 and 48 are positioned to isolate the hydraulic classifier 46, and permit the slurry to flow through conduit 62, valve 48 and line 47 directly to the filter wheel tub 50, and treated as previously described above.

In one specific example the process of the present invention is carried out in the described apparatus, as dolomitic quicklime having an average particle size of about 100 mesh (100% is minus 80 mesh; U.S. standard screen scale), a total impurity analysis ($R_2O_3$, $SiO_2$, $Fe_2O_3$ and $SO_3$) of 0.886%, and a calcium oxide content of 57% is fed into slaker 14 and admixed with water at a temperature of about 80° C. The solids content of the slurry is maintained at 2.9 pounds of lime per gallon of water. The slurry was agitated while maintaining the aforesaid temperature for a period of 100 minutes and then passed to holding tank 26 and to brine reactor 32. The slurry of slaked lime is admixed with prehetaed magnesium chloride brine (80° C.) having the following composition on a dry weight basis:

$MgCl_2$—8%
$CaCl_2$—13%
$NaCl$—5%

The brine treatment was carried out in an agitator of the type described in the aforesaid Patton and Baugh application Serial No. 654,925, for a period of four minutes at 80° C. with the agitator operating at a tip-speed of 1700 feet per minute. The ratio of the brine to the lime slurry components in the reactor was 3.4 to 1 on a volume basis. From the brine reactor 32 the slurry was passed to the hydraulic classifier 46 via line 44. The flow rate was such as to maintain a velocity of 0.3 feet per minute through the classifier. Impurities were removed from the bottom of the classifier by automatic valve (Jamesbury) which was opened at intervals of one second per one hundred seconds of running time.

The resulting purified magnesium hydroxide slurry from the hydraulic classifier 46 was passed to the filter wheel tub 50 at a solids content of about 9½%. The slurry in the filter wheel tub was maintained at a temperature of 80° C. The magnesium hydroxide slurry in the filter wheel tub was accumulated on the filter surface of the filter wheel (equipped with a Dacron cover) at a rate of 3 pounds per square foot per hour (dry solids basis). The residence time in the filter wheel tub was approximately fifty minutes. The total elapsed time from the initiation of the brine treatment to the filtering step was sixty minutes. The filter cake in the filter wheel screen was washed with water at a rate of 0.8 gallon per pound of magnesium hydroxide (dry basis). The filter cake recovered from the filter wheel had a solids content of about 50% and was passed through a drying chamber and dried to a solids content of about 100%.

From the foregoing description it may be seen that the process of the present invention is adapted to the production of magnesium hydroxide by rapid and efficient means. The processes of the prior art involve the use of large settling tanks and have an overall operation time of from several days to as long as three weeks, and the extended process conditions utilized in the prior art methods resulted in a gelatinous precipitate which was filtered with difficulty. The present process, requiring on the order of from 150 to 300 minutes, permits a substantial reduction of the "in process" inventory of materials and eliminates the necessity of using unduly large storage vessels.

The method of this invention produces a magnesium hydroxide slurry which may be filtered relatively easily and permits a high throughput of magnesium hydroxide product per unit of available filter surface area in a given plant. The improvement in filtering rates as compared to the prior art methods ranges from at least twofold to as much as tenfold, thereby permitting substantial reduction of equipment with no sacrifice of output.

Accordingly, the filtering rate may be from 1.7 to 5.5 pounds of magnesium hydroxide per square foot of filter surface per hour and under the most preferred conditions from 3.0 to 5.5 pounds per square foot per hour.

As indicated, the magnesium hydroxide product produced by the process of this invention has sufficient purity to meet National Formulary Specifications. It is furthermore to be noted that the process of the present invention permits the use of relatively fine dolomitic lime, for example, having a particle size of less than 70 mesh, whereas the prior art procedures for producing magnesium hydroxide from dolomitic lime relied on coarse starting materials, such as an average of about 16 mesh, to solve the gelatinization problem. Similarly, additional advantages are found in that the prior art methods required substantial excesses of the magnesium chloride brine, i.e. up to about 30%, whereas the present method uses about a 3% to 10% excess of the stoichiometric amount.

A further advantage of the present invention is that it permits the use of fine lime particles which more readily react with the brine, while the prior art procedures utilizing the conventional coarser lime particles require an extended brine reaction time of from sixty minutes to several hours to permit adequate diffusion of the brine through the slaked lime particles.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A continuous process for preparing magnesium hydroxide which comprises slaking a dolomitic quicklime with water at a temperature of between about 37° C. and the boiling point of the slaking mixture for a period of at least ninety minutes to form a slurry of slaked lime, admixing and contacting said slurry of slaked lime with a magnesium chloride brine under high shear mixing conditions at a temperature of from about 37° C. to the boiling point of the slurry for a period of two to twelve minutes, and thereafter concomitantly filtering and washing said slurry to recover the magnesium hydroxide product, said contacting and admixing with the brine being carried out within a period of up to about one hundred eighty minutes immediately prior to the filtration and washing step.

2. The process of claim 1 wherein the dolomitic quicklime has an average particle size of less than 70 mesh (U.S. standard screen scale).

3. The process of claim 1 wherein the slaking is carried out at a temperature of from 50° to 100° C.

4. The process of claim 1 wherein the slaking is carried out at a temperature of from 80° to 95° C.

5. The process of claim 1 wherein the brine contacting is carried out at a temperature of from 50° to 100° C.

6. The process of claim 1 wherein the brine contacting is carried out at a temperature of from 70° to 95° C.

7. The process of claim 4 wherein the admixing and contacting of the slurry of slaked lime with a magnesium chloride brine under high shear conditions is carried out for a period of from four to six minutes.

8. The process of claim 1 wherein the time period from the initial contacting with brine to the initiation of the filtration step is from forty-five to seventy-five minutes.

9. A continuous process for preparing magnesium hydroxide which comprises slaking a dolomitic quicklime having an average particle size of less than 70 mesh (U.S. standard screen scale) with water at a temperature between about 50° C. and 100° C. for a period of at least about one hundred twenty minutes to form a slurry of slaked lime in water, admixing and contacting said slurry of slaked lime with a magnesium chloride brine under high shear conditions for a period of from two to twelve minutes and at a temperature of from 70° to 95° C., and thereafter concomitantly filtering and washing said slurry to recover the magnesium hydroxide product, said contacting and admixing with the brine being carried out within a period of from forty-five to seventy-five minutes immediately prior to the filtration and washing step.

10. The process of claim 9 wherein the slaking is carried out at a temperature of from 80° to 95° C.

11. The process of claim 9 wherein the admixing and contacting of the slurry of slaked lime with a magnesium chloride brine under high shear mixing conditions is carried out for a period of from four to six minutes.

12. The process of claim 9 wherein the dolomitic quicklime has an average particle size of less than about 150 mesh.

13. The process of claim 9 wherein the magnesium chloride brine utilized contains magnesium chloride in an amount of from the stoichiometric amount to a 10% excess of the stoichiometric amount required to react with and convert the calcium hydroxide present in the slaked dolomitic quicklime to magnesium hydroxide.

14. The process of claim 13 wherein the magnesium chloride is present in the brine utilized in a stoichiometric excess of from 3 to 10%.

15. A continuous process for preparing magnesium hydroxide which comprises slaking a dolomitic quicklime havingg an average particle size of less than 70 mesh (U.S. standard screen scale) with water at a temperature between about 50° C. and 100° C. for a period of at least about one hundred twenty minutes to form a slurry of slaked lime in water, admixing and contacting said slurry of slaked lime with magnesium chloride brine under high shear conditions for a period of from two to twelve minutes and at a temperature of from 70° to 95° C., hydraulically classifying the slurry resulting from the said admixture of the slurry of slaked lime and magnesium chloride brine, and removing therefrom heavy impurities to purify said slurry, and thereafter concomitantly filtering and washing said slurry to recover the magnesium hydroxide product, said contacting and admixing with the brine being carried out within a period of from forty-five to seventy-five minutes immediately prior to the filtration and washing step.

References Cited in the file of this patent
UNITED STATES PATENTS

| | | |
|---|---|---|
| 2,041,047 | Chesney et al. | May 19, 1936 |
| 2,224,780 | Chesney | Dec. 10, 1940 |
| 2,255,422 | Heath et al. | Sept. 9, 1941 |
| 2,405,055 | Robinson et al. | July 30, 1946 |
| 2,493,752 | Maestri | Jan. 10, 1950 |